UNITED STATES PATENT OFFICE.

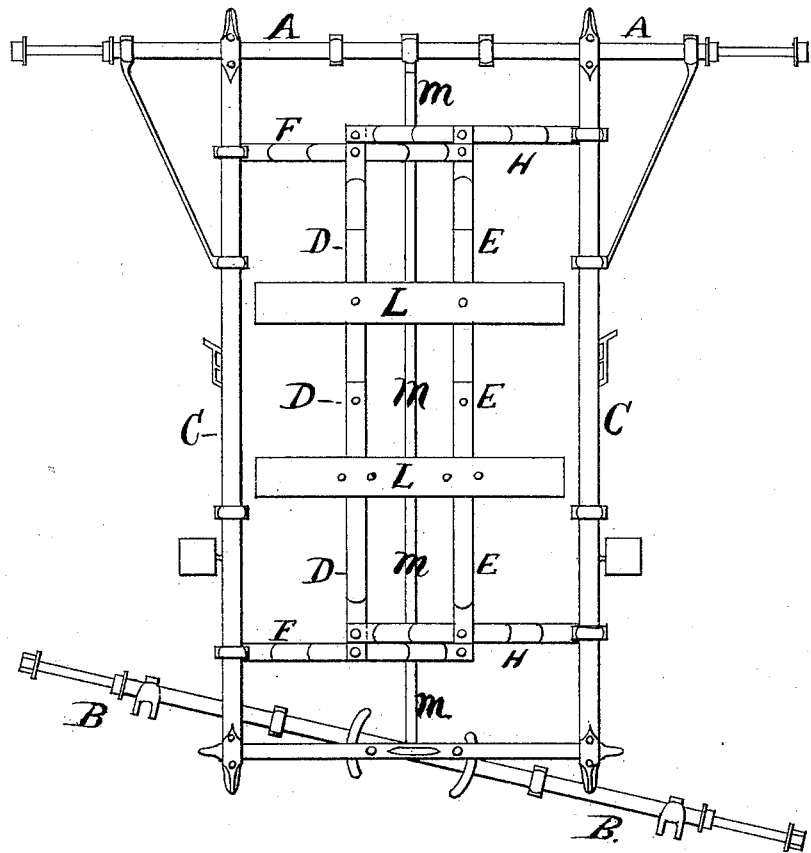

GEORGE PENN AND JONAH D. WHITNEY, OF SYRACUSE, NEW YORK.

VEHICLE-SPRING.

SPECIFICATION forming part of Letters Patent No. 277,504, dated May 15, 1883.

Application filed September 8, 1882. (No model.)

*To all whom it may concern:*

Be it known that we, GEORGE PENN, a citizen of the Dominion of Canada, residing at Syracuse, Onondaga county, New York, who has duly declared his intention of becoming a citizen of the United States, and JONAH D. WHITNEY, a citizen of the United States, residing at Syracuse, Onondaga county, New York, have jointly invented certain Improvements in Wagon-Springs, of which the following is a specification, reference being had to the accompanying drawing, in which is shown a top plan view of the spring set up complete.

Our invention relates to buggy and wagon springs; and it consists in the partial cross-wearing together of several component springs and of their combination with the side bars of a wagon.

A represents the hind axle; B, the front axle.

C C are ordinary side bars connecting the axles.

D and E are two long springs parallel to the side bars, equidistant from them and usually from each other. They are supported by and upon the cross-springs F and H. The outer ends of these cross-springs are attached to the side bars by hinge-clips, or in the usual way. The inner ends of these short springs are attached to or support the long springs D and E as follows: The spring F passes under the spring D and up onto the top of the spring E, and the spring H passes under the spring E and up onto the top of the spring D, thus making a self-sustaining bridge at each end of the long springs D and E. These spring F and H are attached or secured to the long springs at their points of intersection, and lapping by bolts or rivets; or they may be only fastened together at the points where the cross-springs lap up onto the top of the long springs.

L L are rider-bars mounted upon and attached securely to the long springs in about the relative positions shown in the drawings. On these the body is mounted.

M represents the reach of the wagon.

The cross-springs F H may be extended clear across from one side bar to the other. The long springs can also be cut in two, or two short springs used instead of one, and these two parts run past each other and bridge upon the rider-bars, the same way as the cross-springs bridge upon the long springs.

By this construction we secure a great self-equalization of spring-power and elasticity of motion, and almost entirely avoid all jerking movement of the body of the wagon when it is passing over rough and uneven surfaces; or, as an equivalent construction, we can pass the cross-springs wholly over or under the long springs, or the long springs wholly under or over the cross-springs or rider-bars, and fasten them securely together at the points of crossing, and make the bridge in that way.

What we claim, and desire to secure by Letters Patent, is—

1. In combination with the side bars and body-riders, a pair of parallel longitudinal springs, and a pair of crossed transverse springs at each end of said longitudinal springs, each of said transverse springs being connected to a side bar and a longitudinal spring, substantially as specified.

2. In combination with the side bars, C, the long springs D E and short springs F H, crossed and connected together substantially as and for the purposes specified.

3. The combination of the long springs D E and short springs F H, crossed and connected together as shown, and surmounted by the body rider-bars L, with the side bars, C, constructed and operating together substantially as and for the purposes set forth.

In witness whereof we have hereunto set our hands this 4th day of September, 1882.

GEORGE PENN.
JONAH D. WHITNEY.

In presence of—
C. W. SMITH,
T. T. BREWSTER, Jr.